US008509550B2

(12) United States Patent
Jeon et al.

(10) Patent No.: US 8,509,550 B2
(45) **Date of Patent: *Aug. 13, 2013**

(54) APPARATUS FOR DETERMINING MOTION VECTORS AND A REFERENCE PICTURE INDEX FOR A CURRENT BLOCK IN A PICTURE TO BE DECODED

(75) Inventors: Byeong Moon Jeon, Seoul (KR); Yoon Seong Soh, Seoul (KR)

(73) Assignee: LG Electronics Inc., Seoul (KR)

( * ) Notice: Subject to any disclaimer, the term of this patent is extended or adjusted under 35 U.S.C. 154(b) by 1046 days.

This patent is subject to a terminal disclaimer.

(21) Appl. No.: 11/907,460

(22) Filed: Oct. 12, 2007

(65) Prior Publication Data

US 2008/0037645 A1 Feb. 14, 2008

Related U.S. Application Data

(62) Division of application No. 10/337,808, filed on Jan. 6, 2003.

(30) Foreign Application Priority Data

Jul. 18, 2002 (KR) ................................ 42204/2002
Jul. 26, 2002 (KR) ................................ 44162/2002

(51) Int. Cl.
*G06K 9/36* (2006.01)
*G06K 9/46* (2006.01)

(52) U.S. Cl.
USPC .......................................................... 382/236

(58) Field of Classification Search
None
See application file for complete search history.

(56) References Cited

U.S. PATENT DOCUMENTS 5,510,840 A 4/1996 Yonemitsu et al.
5,905,535 A 5/1999 Kerdranvat et al.
5,991,447 A 11/1999 Eifrig et al.
6,026,195 A 2/2000 Chen et al.
6,052,150 A 4/2000 Kikuchi et al.

(Continued)

FOREIGN PATENT DOCUMENTS

CN 1344113 4/2002
CN 1349354 5/2002

(Continued)

OTHER PUBLICATIONS

"H.26L Test Model Long Term No. 8 draft 0", ITU-Telecommunications Standardization Sector, Sections 3.6, 3.7.2.1 and 7.5.1, Document VCEG, Jun. 28, 2001.*

(Continued)

*Primary Examiner* — Samir Ahmed
(74) *Attorney, Agent, or Firm* — Harness, Dickey & Pierce, P.L.C.

(57) ABSTRACT

In one embodiment, the apparatus includes a decoder. The decoder is configured to obtain first and second motion vectors and a reference picture index of at least one block other than the current block. The other blocks neighbor the current block. The decoder configured to determine a direction of the first and second motion vectors of the other blocks. The decoder is configured to determine first and second motion vectors of the current block based on the determined directions using the first and second motion vectors of the other blocks. This determination includes applying a median operation to the first motion vectors of the other blocks and applying a median operation to the second motion vectors of the other blocks.

1 Claim, 5 Drawing Sheets

(56) References Cited

U.S. PATENT DOCUMENTS

| | | | | |
|---|---|---|---|---|
| 6,097,842 | A | 8/2000 | Suzuki et al. | |
| 6,100,931 | A | 8/2000 | Mihara | |
| 6,148,026 | A | 11/2000 | Puri et al. | |
| 6,160,849 | A | 12/2000 | Igarashi et al. | |
| 6,226,327 | B1 | 5/2001 | Igarashi et al. | |
| 6,233,356 | B1 | 5/2001 | Haskell et al. | |
| 6,289,049 | B1 | 9/2001 | Kim et al. | |
| 6,324,214 | B2 | 11/2001 | Mihara | |
| 6,366,616 | B1 | 4/2002 | Mizuno et al. | |
| 6,389,071 | B1 | 5/2002 | Wilson | |
| 6,404,814 | B1 | 6/2002 | Apostolopoulos et al. | |
| 6,414,991 | B1 | 7/2002 | Yagasaki et al. | |
| 6,427,027 | B1 | 7/2002 | Suzuki et al. | |
| 6,486,874 | B1 | 11/2002 | Muthuswamy et al. | |
| 6,507,672 | B1 | 1/2003 | Watkins et al. | |
| 6,526,177 | B1 | 2/2003 | Haskell et al. | |
| 6,687,297 | B2 | 2/2004 | Bruls | |
| 6,816,552 | B2 | 11/2004 | Demos | |
| 6,909,743 | B1 * | 6/2005 | Ward et al. | 375/240.01 |
| 6,980,596 | B2 * | 12/2005 | Wang et al. | 375/240.16 |
| 6,983,018 | B1 | 1/2006 | Lin et al. | |
| 7,003,035 | B2 * | 2/2006 | Tourapis et al. | 375/240.12 |
| 2001/0000072 | A1 | 3/2001 | Nishikawa et al. | |
| 2001/0004385 | A1 | 6/2001 | Okumura et al. | |
| 2001/0012403 | A1 | 8/2001 | Takizawa et al. | |
| 2001/0055059 | A1 | 12/2001 | Satoda | |
| 2002/0005898 | A1 | 1/2002 | Kawada et al. | |
| 2002/0041631 | A1 | 4/2002 | Arita et al. | |
| 2002/0080103 | A1 | 6/2002 | Choi | |
| 2003/0174774 | A1 | 9/2003 | Mock et al. | |
| 2004/0146105 | A1 | 7/2004 | Kondo et al. | |
| 2004/0213468 | A1 | 10/2004 | Lee et al. | |

FOREIGN PATENT DOCUMENTS

| | | | |
|---|---|---|---|
| DE | 10300528 | | 2/2004 |
| EP | 0 410 826 | | 6/1990 |
| EP | 0936575 | | 8/1999 |
| EP | 1 039 746 | A2 | 9/2000 |
| EP | 1 198 140 | | 4/2002 |
| GB | 2357925 | | 7/2001 |
| JP | 08-251601 | | 9/1996 |
| JP | 10257495 | | 9/1998 |
| JP | 11-004441 | | 1/1999 |
| JP | 11-069357 | | 3/1999 |
| JP | 2002-094987 | | 3/2002 |
| JP | 2000-278697 | | 10/2002 |
| JP | 2004-56756 | | 2/2004 |
| JP | 2008169275 | | 7/2008 |
| JP | 2008-245329 | | 10/2008 |
| KR | 10-1999-0015907 | | 3/1999 |
| KR | 10-1999-0027469 | | 4/1999 |
| KR | 10-2000-0008513 | | 2/2000 |
| KR | 10-1999-0058929 | | 7/2001 |
| RU | 2182727 | | 5/2002 |
| WO | WO 97/43856 | A1 | 11/1997 |
| WO | WO 00/33581 | | 6/2000 |
| WO | WO 2001/72045 | | 9/2001 |
| WO | WO 02/37859 | | 5/2002 |

OTHER PUBLICATIONS

"Text of Committee Draft of Joint Video Specification (ITU-T Rec. H.264 |ISO/IEC 14496-10 AVC)", May 2002, Fairfax, VA.*

Richardson, Sections 6.1.1 and 6.4.2, H.264 and MPEG-4 Video Compression, Video coding for next-generation Multimedia, Wiley, 2003.

"JVT Coding—(ITU-T H.26L & ISO/IEC JTC1 Standard)—Working Draft No. 2 (WD-2)", ITU-T JVY-B118, Mar. 2002, Front Page and Sections 4.3.11-4.3.14 and 7.4.

"Text of Committee Draft of Joint Video Specification (ITU-T REC. H.264/ISO/IEC 14496-10 AVC)"; International Standard ISO/IEC; May 2002; pp. I-X, 1-133, XP001074690; paragraphs '03.6!, '3.49!, '8.4.3!, '8.5.5!, '9.2.1.1!, '1.1.1!, '11.2!, '11.3!, 11.4!; figures 9-1.

Russian Patent Office communication dated Sep. 29, 2008.

German Office Action, dated Sep. 27, 2010, issued by the German Patent and Trademark Office for Application No. 103 62 295.0-55 and English translation thereof.

German Office Action, dated Sep. 30, 2010, issued by the German Patent and Trademark Office for Application No. 103 62 291.8-55 and English translation thereof.

MPEG-4 Video classification model version 7.0. In: ISO/IEC JTC1/SC29/WG11 document MPEG97/1642, Meeting Apr. 1997, Bristol UK, pp. 47-50, 69-75.

Office Action for corresponding German Application. 103 62 293.4 dated May 8, 2012 and English translation thereof.

Office Action for corresponding Korean Application No. 10-2006-0067743, dated Jan. 29, 2010.

Office Action for corresponding Korean Application No. 10-2009-0018277, dated Sep. 19, 2009.

Office Action for corresponding Korean Application No. 10-2009-0018280, dated May 27, 2009.

Office Action for corresponding Korean Application No. 10-2008-0089788, dated Mar. 12, 2009.

Office Action for corresponding Korean Application No. 10-2008-0011696, dated Jun. 9, 2008.

Office Action for corresponding Korean Application No. 10-2008-0011698, dated Jan. 19, 2009.

Office Action for corresponding Korean Application No. 10-2002-0076714, dated Oct. 10, 2008.

Patent Gazette for corresponding Chinese Application No. 100512444, dated Jul. 8, 2009.

Office Action for corresponding German Application No. 103 62 152.0-55, dated Dec. 7, 2007.

Office Action for corresponding German Application No. 103 62 297.7, dated Oct. 24, 2011.

Office Action for corresponding German Application No. 103 62 152.0-55, dated Sep. 27, 2010.

Office Action for corresponding Japanese Application No. 2007-222563, dated May 1, 2008.

Decision on Grant of Patent for corresponding Russian Application No. 2003100395/9, dated Mar. 10, 2005.

Office Action for corresponding U.S. Appl. No. 11/907,459, dated Jul. 8, 2008.

Byeong-Moon Jeon, "Motion Vector Prediction and Prediction Signal in B Pictures," Joint Video Team (JVT) of ISO/IEC MPEG & ITU-T VCEG (ISO/IEC JTC1/SC29/WG11 and ITU-T SG16 Q.6), 4th Meeting: Klegenfurt, Austria, dated Jul. 22-26, 2002.

"H.26L Test Model Long Term No. 8 draft 0," ITU-Telecommunications Standardization Sector, Sections 3.6, 3.7.2.1, 7.1-7.2 and 7.5.1, Document VCEG, dated Jun. 28, 2001.

Japanese Office Action for Japanese patent application No. 2008-169349, dated May 6, 2011.

Japanese Office Action for Japanese patent application No. 2008-169302, dated May 6, 2011.

Office Action for corresponding U.S. Appl. No. 11/907,462, dated Jan. 16, 2009.

Office Action for corresponding U.S. Appl. No. 11/907,456, dated Jun. 24, 2008.

Office Action for corresponding U.S. Appl. No. 11/907,461, dated Jul. 25, 2008.

Office Action for corresponding U.S. Appl. No. 11/907,456, dated Mar. 20, 2009.

Office Action for corresponding U.S. Appl. No. 10/337,808, dated Jan. 2, 2008.

Japaense Office Action for Japanese patent application No. 2008-169349, dated Jul. 24, 2008.

Japanese patent application No. 2008-169349, filed Jul. 24, 2008.

GB Search Report dated Nov. 15, 2005.

"Text of Committee Draft of Joint Video Specification (ITU-T REC. H.264/ISO/IEC 14496-10 AVC)"; International Standard ISO/IEC; May 2002; pp. I-X, 1-133, XP001074690; paragraphs '03.6!, '3.49!, '8.4.3!, '8.5.5!, '9.2.1.1!, '1.1.!, '11.2!, '11.3!, '11.4!; figures 9-1.

"Text of Committee Draft of Joint Video Specification (ITU-T REC. H.264/ISO/IEC 14496-10 AVC)"; JVT of ISO/IEC MPEG and ITU-T VCEG, May 2002; pp. 46, 100-106.

Office Action for corresponding Japanese application No. JP 2008-169349 dated Sep. 10, 2010.
Office Action for corresponding Japanese application No. JP 2008-169302 dated Sep. 10, 2010.
Office Action for corresponding Japanese application No. JP 2008-169280 dated Sep. 10, 2010.
Office Action for corresponding Japanese application No. JP 2008-169101 dated Sep. 10, 2010.
Office Action for corresponding Japanese application No. JP 2008-169296 dated Sep. 10, 2010.

* cited by examiner

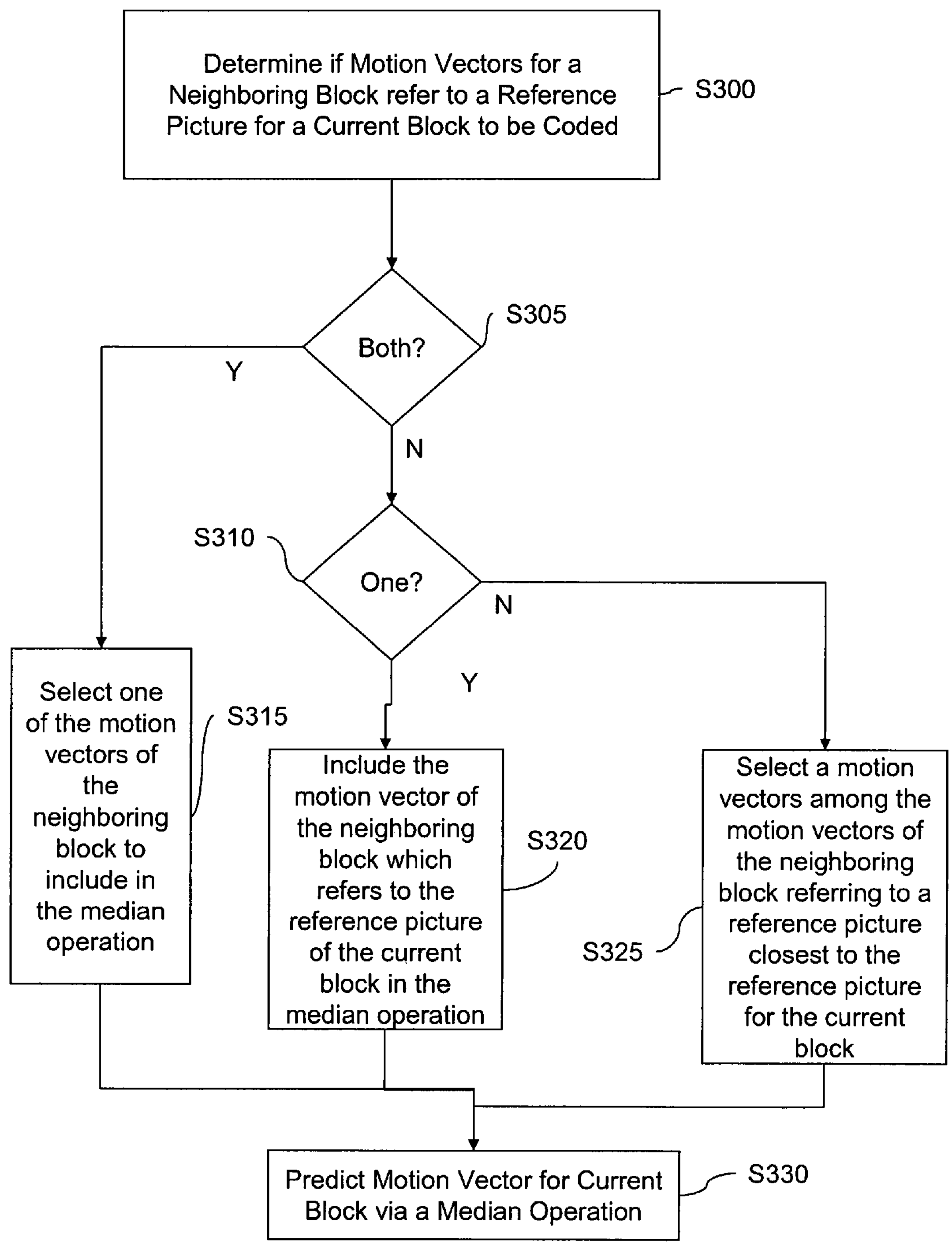
FIG. 4
Determine if Motion Vectors for a Neighboring Block refer to a Reference Picture for a Current Block to be Coded
S300
Both?
S305
Y
N
S310
One?
N
Y
Select one of the motion vectors of the neighboring block to include in the median operation
S315
Include the motion vector of the neighboring block which refers to the reference picture of the current block in the median operation
S320
Select a motion vectors among the motion vectors of the neighboring block referring to a reference picture closest to the reference picture for the current block
S325
Predict Motion Vector for Current Block via a Median Operation
S330

APPARATUS FOR DETERMINING MOTION VECTORS AND A REFERENCE PICTURE INDEX FOR A CURRENT BLOCK IN A PICTURE TO BE DECODED

DOMESTIC PRIORITY INFORMATION

This is a divisional of, and claims priority under 35 U.S.C. §120 to, U.S. application Ser. No. 10/337,808, filed Jan. 6, 2003, hereby incorporated by reference in its entirety.

FOREIGN PRIORITY INFORMATION

The present invention claims priority under 35 U.S.C. 119 on Korean Application Nos. 2002-42204 and 2002-44162 which were filed on Jul. 18, 2002 and Jul. 26, 2002, respectively; the contents of all of which are hereby incorporated by reference in their entirety.

BACKGROUND OF THE INVENTION

1. Field of the Invention

The present invention relates to a moving picture coding system, and more particularly to a prediction motion vector calculation method by defining a motion vector to be used in a median operation when a neighboring block around a block to be coded has a plurality of motion vectors, so as to obtain a prediction motion vector (PMV) of the block to be coded; using motion vector information of neighboring blocks, and improve a coding efficiency.

2. Description of the Related Art

Generally, in order to reduce the amount of bits to be used for the transfer of motion information, an encoder, instead of sending a motion vector Mv directly to a decoder, selects a median value of motion vectors of three neighboring blocks through a median operation, determines the selected median value as a prediction motion vector PMV, obtains a difference MVD between the MV and the PMV (i.e., MVD=MV−PMV), and sends the obtained difference MVD to the decoder.

Then, the decoder obtains the motion vector MV by obtaining the prediction motion vector PMV in the same manner as the encoder and adding the sent MVD to the obtained PMV. In FIG. 1, a block E is a block to be coded (or decoded), and blocks A, B and C are neighboring blocks of the block E. Defining motion vectors of the neighboring blocks A, B and C, respectively, as $MV_A$, $MV_B$ and $MV_C$, a prediction motion vector PMV of the block E can be obtained through a median operation as follows:

$$PMV=median\{MV_A,MV_B,MV_C\}$$

A block D in FIG. 1 is a block which is used instead of the block C when the block C exists outside of a picture. Provided that only one of the three blocks A, B and C, or A, B and D refers to the same reference picture as that referred to by the block E, a motion vector MV of that block will be used as the prediction motion vector PMV. This motion information sending method is, applied to all pictures irrespective of their types.

On the other hand, a B picture has five types of predictive modes such as forward mode, backward mode, bi-predictive mode, direct mode and intra mode. Generally, a neighboring block in the forward mode has one motion vector MVFW obtained from a forward reference picture with an index ref_idx_fwd, and a neighboring block in the backward mode has one motion vector MVBW obtained from a backward reference picture with an index ref_idx_bwd.

In the bi-predictive mode of the B picture, the prediction is allowed from different directions and the same directions, such as forward/forward, backward/backward, and forward/backward. Each reference picture uses the index ref_idx_fwd or ref_idx_bwd regardless of its direction (forward or backward), and each motion vector is also represented as MVFW or MVBW regardless of its direction (The reason is that the predefined ‘syntaxes’ are used as they are. For expression of the syntaxes, ‘ref_idx_10’ or ‘ref_idx_11’ may be used for each index and ‘mv_list 0’ or ‘mv_list 1’ may be used for each motion vector.). The direct mode of the B picture is a predictive mode where motion information is not sent to the decoder and motion vectors MVf and MVb and reference pictures are derived from the inside of the decoder. The fact that the derived motion vectors are represented as MVf and MVb irrespective of their directions is the same as that in the bi-predictive mode.

In a conventional method for calculating a prediction motion vector PMV of the B picture, a forward prediction motion vector of the block E is obtained by extracting only forward motion vectors of the neighboring blocks and performing a median operation with respect to the extracted forward motion vectors. If one of the neighboring blocks has no forward motion vector, its motion vector is set to 0 and the median operation is performed under such a condition. This method is similarly applied to a backward prediction motion vector of the block E, so as to use only backward motion vectors of the neighboring blocks. If one of the neighboring blocks is in the intra mode, its motion vector is set to 0, the neighboring block is considered to refer to a reference picture different from that referred to by the block E, and the prediction motion vector PMV is obtained under such a condition.

However, as stated above, in the bi-predictive mode of the B picture, the prediction is allowed from different directions and the same directions, such as forward/forward, backward/backward, and forward/backward, each reference picture uses the index ref_idx_fwd or ref_idx_bwd regardless of its direction (forward or backward), and each motion vector is also represented as MVFW or MVBW regardless of its direction. As a result, there is a need to define a method for calculating a prediction motion vector PMV when a neighboring block having two motion vectors exists.

Provided that a neighboring block is in the bi-predictive mode (or the direct mode), motion vectors MVFW and MVBW (or MVf and MVb) thereof may have the same directions such as forward/forward or backward/backward, or different directions such as forward/backward. This direction information of the motion vectors cannot be determined from only the motion vector syntaxes ‘MVFW’ and ‘MVBW’ or the reference picture indexes ‘ref_idx_fwd’ and ‘ref_idx_bwd’. The conventional method for calculating the PMV of the B picture gives no accurate description of such a problem, resulting in great confusion.

For example, in the case where a neighboring block is in the bi-predictive mode having two motion vectors in the forward/forward directions, the conventional PMV calculation method gives no clearly defined determination as to whether both or any one of the two motion vectors must be used for the calculation of the forward prediction motion vector PMV of the block E.

SUMMARY OF THE INVENTION

The present invention relates to a method for assigning direction information to reference pictures and a method for determining the directions of the reference pictures, wherein unique information enabling the acquisition of direction information of motion vectors is assigned to each reference picture, so that information regarding a direction from each neighboring block to each reference picture can be acquired.

The present invention relates to providing a prediction motion vector calculation method by defining a motion vector to be used in a median operation when a neighboring block of a block to be coded has a plurality of motion vectors, so as to obtain a prediction motion vector (PMV) of the block to be coded, using motion vector information of neighboring blocks, and improve a coding efficiency.

In one embodiment, direction information is assigned to a reference picture as a feature of the reference picture, so as to give the direction information of the reference picture pointed by reference picture index.

The direction information may be indicative of the display order of each reference picture may be represented by a picture order count (POC) value.

In accordance with another aspect of the present invention, there is provided a method for determining directions of reference pictures pointed to, respectively, by reference picture indexes, comprising the step of acquiring display order information of each reference picture, comparing display order information with display order information of a block to be currently coded, and determining a direction (forward or backward) of each reference picture against the block to be currently coded.

The display order information of each reference picture may be acquired from a POC value.

In accordance with yet another aspect of the present invention, there is provided a method for calculating a prediction motion vector (PMV) of a block to be coded, by performing a median operation using motion vectors of neighboring blocks, comprising the steps of a), if the neighboring blocks have the motion vectors, acquiring direction information of reference pictures pointed by the motion vectors of the neighboring blocks; and b) selecting ones of the motion vectors of the neighboring blocks with reference to the acquired direction information and performing the median operation including the selected motion vectors to obtain the prediction motion vector of the block to be coded.

The step a) may include the step of determining the direction information of the motion vectors by comparing display order information of the reference pictures pointed by the motion vectors of the neighboring blocks with display order information of the block to be coded.

The step b) may include the step of, if one of the neighboring blocks has two motion vectors with different directions, selecting one of the two motion vectors having the same direction as that of the prediction motion vector and performing the median operation including the selected motion vector to obtain the prediction motion vector.

Alternatively, the step b) may include the step of, if one of the neighboring blocks has two motion vectors with the same directions, which are different from that of the prediction motion vector, setting the two motion vectors to 0, considering the neighboring block to refer to a reference picture different from that referred to by the block to be coded, and performing the median operation including the zero motion to obtain the prediction motion vector.

Alternatively, the step b) may include the step of b-1), if one of the neighboring blocks has two motion vectors MV1 and MV2 with the same directions, which are the same as that of the prediction motion vector, and both the two motion vectors MV1 and MV2 refer to the same reference picture, selecting one of the two motion vectors MV1 and MV2 and performing the median operation including the selected motion vector to obtain the prediction motion vector.

The step b-1) may include the step of b-2) selecting one of the two motion vectors MV1 and MV2 to be earlier decoded or having the same mode (MV1 mode or MV2 mode) as that of the prediction motion vector, and performing the median operation including the selected motion vector to obtain the prediction motion vector. Here, the motion vector having the same mode signifies a motion vector having the same transcription as that indicative of the prediction motion vector.

Alternatively, the step b) may include the step of, if one of the neighboring blocks has two motion vectors MV1 and MV2 with the same directions, which are the same as that of the prediction motion vector, and only one of the motion vectors MV1 and MV2 refers to a reference picture referred to by the block to be coded, selecting one of the motion vectors MV1 and MV2 referring to the reference picture referred to by the block to be coded, and performing the median operation including the selected motion vector to obtain the prediction motion vector.

Alternatively, the step b) may include the step of, if one of the neighboring blocks has two motion vectors MV1 and MV2 with the same directions, which are the same as that of the prediction motion vector, neither of the motion vectors MV1 and MV2 refers to a reference picture referred to by the block to be coded and they refer to different reference pictures, selecting one of the motion vectors MV1 and MV2 referring to a reference picture closest to the reference picture referred to by the block to be coded, or a reference picture closest to a picture to be currently coded, and performing the median operation including the selected motion vector to obtain the prediction motion vector.

Alternatively, the step b) may include the step of, if one of the neighboring blocks has one motion vector with a direction different from that of the prediction motion vector, setting the motion vector of the neighboring block to 0, considering the neighboring block to refer to a reference picture different from that referred to by the block to be coded, and performing the median operation including the zero motion of the neighboring block to obtain the prediction motion vector.

Alternatively, the step b) may include the step of, if one of the neighboring blocks has one motion vector with the same direction as that of the prediction motion vector, performing the median operation including the motion vector of the neighboring block to obtain the prediction motion vector.

The present invention still further relates to an apparatus for determining motion vectors and a reference picture index for a current block in a picture to be decoded.

In one embodiment, the apparatus includes a decoder. The decoder is configured to obtain first and second motion vectors and a reference picture index of at least one blocks other than the current block. The other blocks neighbor the current block at one of a left, top and top right position. The decoder is configured to determine a direction of the first and second motion vectors of the other blocks. The decoder is configured to determine first and second predication motion vectors of the current block based on the determined directions using the first and second motion vectors of the other blocks. This determination includes applying a median operation to the first motion vectors of the other blocks and applying a median operation to the second motion vectors of the other blocks.

BRIEF DESCRIPTION OF THE DRAWINGS

The above and other features and advantages of the present invention will become more apparent to those of ordinary skill in the art by describing in detail example embodiments thereof with reference to the attached drawings in which:

FIG. 4 is a flow chart illustrating a motion vector calculation for a case where two motion vectors of a neighboring block have the same directions, which are the same as that of a prediction motion vector, according to another example embodiment of the present invention.

DETAILED DESCRIPTION OF EXAMPLE EMBODIMENTS

If a neighboring block of a block to be coded is in a bi-predictive mode (or a direct mode), motion vectors MVFW and MVBW (or MVf and MVb) thereof may have the same directions such as forward/forward and backward/backward, or different directions such as forward/backward. This direction information of the motion vectors cannot be determined from only motion vector syntaxes 'MVFW' and 'MVBW' or reference picture indexes 'ref_idx_fwd' and 'ref_idx_bwd'. For this reason, there is a need to acquire the direction information by referring to different unique information held by reference pictures.

This invention proposes a method for acquiring direction information of motion vectors by comparing the display orders of reference pictures, and calculating a prediction motion vector PMV on the basis of the acquired direction information.

Now, example embodiments of the present invention will be described in detail with reference to the annexed drawing.

1. Recognition of Motion Vector Directions Through, Display Order Comparison

Direction information of motion vectors of neighboring blocks must be acquired before calculation of a prediction motion vector PMV of a block to be coded. Then, through the direction information of the motion vectors of the respective neighboring blocks, determinations are made as to whether the motion vectors of the neighboring blocks must be included in the median operation.

In general, if a neighboring block is in a forward mode or backward mode having one motion vector, the direction of that motion vector can be determined from a reference picture index. However, in the case where a neighboring block is in a bi-predictive mode or direct mode having two motion vectors, it is impossible to recognize actual directions of reference pictures pointed to by two reference picture indexes.

The reason is as follows. A decoder of a moving picture coding system which allows multiple reference pictures and a B picture to be used as references cannot estimate direction information only with reference picture indexes because it cannot accurately acquire the number of forward reference pictures and backward reference pictures of the B picture to be currently decoded, even though it can recognize the relation between a default forward/backward indexing order and a relative forward/backward indexing order from re-mapping information sent from an encoder.

Figure 2:
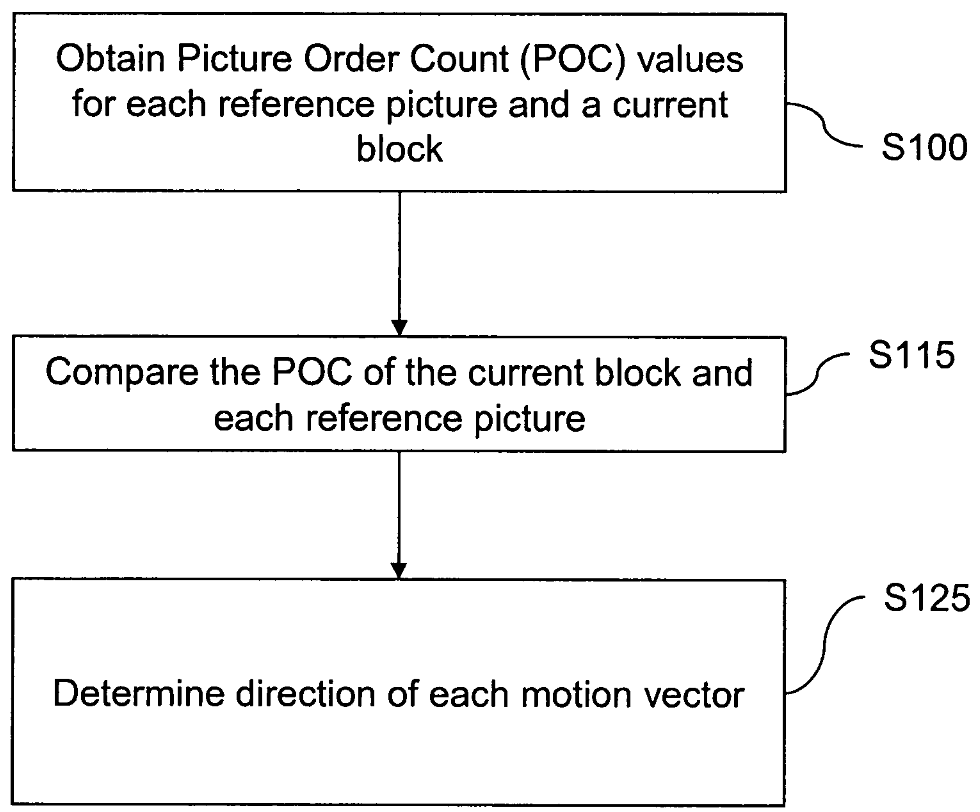
FIG. 2 illustrates a process of determining a direction of a motion vector for a current block in a picture to be decoded according to an example embodiment of the present invention.

In the present invention, it is proposed that a reference picture pointed to by a reference picture index will include unique information indicative of its display order for recognition of its direction. This display order is represented by a picture order count (POC) value. FIG. 2 illustrates a process of determining a direction of a motion vector for a current block in a picture to be decoded according to an example embodiment of the present invention. In the example embodiment of FIG. 2, the direction of each motion vector can be easily recognized (step S125) by comparing, in step S115, a display order of each reference picture pointed to by each reference picture index with a display order picture of the B picture to be currently coded, the display orders of which are obtained in step S100. As is well-known in the art, the comparison may be based on an inequality determination, or alternatively by taking a difference between the two POC values and assessing the difference. Accordingly, the motion vector(s) for the current block are predicted based upon the operations described below with respect to scenarios 2.1, 2.2 or 2.3, based upon the determined direction for each motion vector.

Figure 1:
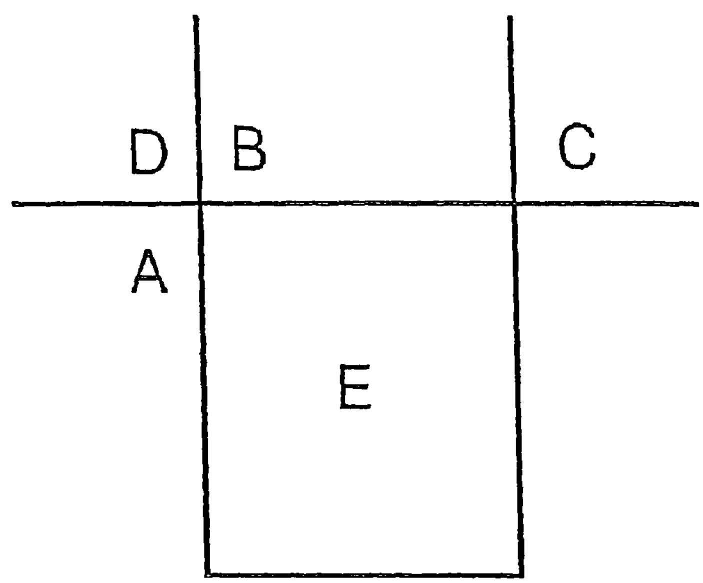
FIG. 1 is a view illustrating the calculation of a prediction motion vector of a block E using motion vectors of neighboring blocks A, B and C.

2. Median Operation for Calculation of Prediction Motion Vector PMV when Neighboring Block is in Bi-Predictive Mode or Direct Mode If a neighboring block of a block to be coded is in the bi-predictive mode or direct mode, it has two motion vectors. Of these motion vectors, one having the same direction as that of a prediction motion vector PMV of the block to be coded will have to be used for the median operation. A detailed description will hereinafter be given of the efficient prediction motion vector PMV calculation method proposed by the present invention. For the convenience of description, assume that a block to be coded is E, neighboring blocks are A, B, C and D, and two motion vectors of each neighboring block are MV1 and MV2, as shown in FIG. 1.

Figure 3:
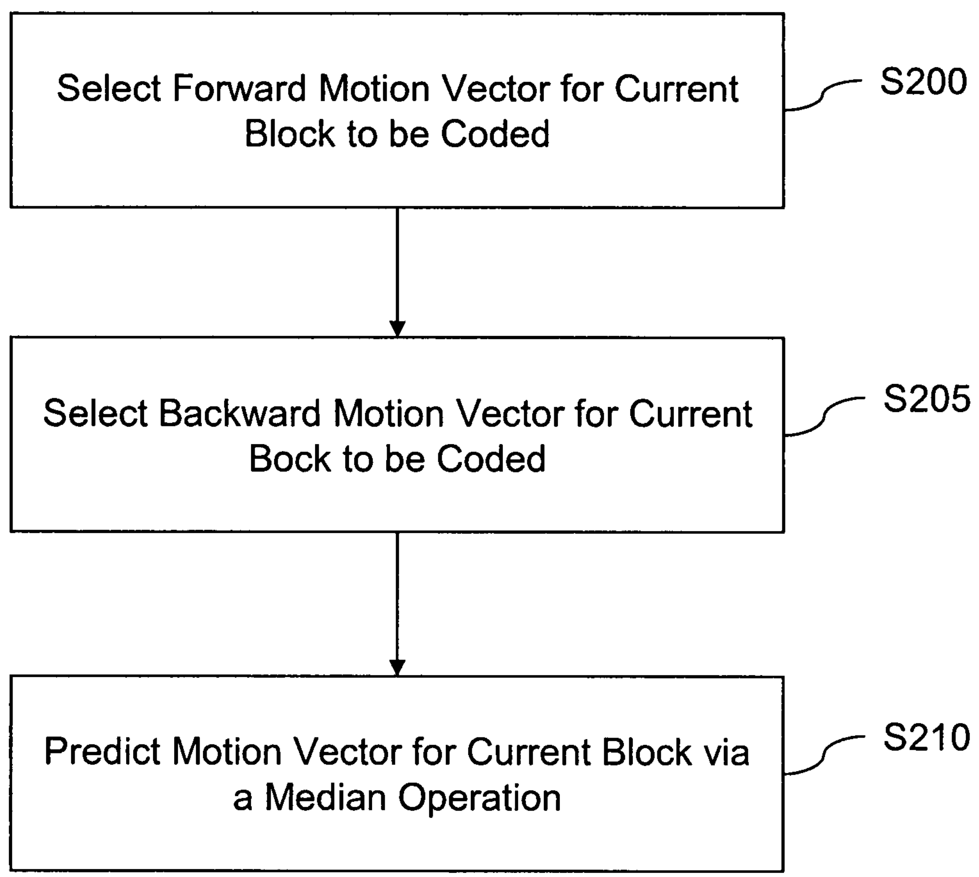
FIG. 3 is a flow chart illustrating a motion vector calculation for a case where two motion vectors of a neighboring block have different directions according to an example embodiment of the present invention.

2.1 Case Where Two Motion Vectors of Neighboring Block have Different Directions FIG. 3 is a flow chart illustrating a motion vector calculation for a case where two motion vectors of a neighboring block have different directions according to an example embodiment of the present invention.

A motion vector having the same direction as that of a prediction motion vector PMV of a block to be coded is selected and the prediction motion vector PMV is then calculated through the median operation.

In other words, referring to the example embodiment of FIG. 3, a forward motion vector is selected for calculation of the PMV with respect to a forward prediction motion vector of the block E in step S200, and a backward motion vector is selected for calculation of the PMV with respect to a backward prediction motion vector of the block E in step S205. Then, the prediction motion vector PMV of each direction is obtained through the median operation in step S210.

2.2 Case Where Two Motion Vectors of Neighboring Block have the Same Directions, which are the Same as that of Prediction Motion Vector PMV FIG. 4 is a flow chart illustrating a motion vector calculation for a case where two motion vectors of a neighboring block have the same directions, which are the same as that of a prediction motion vector, according to another example embodiment of the present invention.

In the example embodiment of FIG. 4, in step S300, a determination is made as to whether two motion vectors MV1 and MV2 of a neighboring block refer to a reference picture referred to by the block E to be coded.

If both the motion vectors MV1 and MV2 refer to the same reference picture (as determined in step S305), one of them (for example, a motion vector to be earlier decoded, or a motion vector having the same mode (MV1 mode or MV2 mode) as that of a prediction motion vector) is selected in step S315 and included in the median operation for calculation of the prediction motion vector PMV in step S330. Here, the motion vector having the same mode signifies a motion vector having the same transcription as that indicative of the prediction motion vector. Also, the reference picture referred to by the motion vectors MV1 and MV2 may be the same as or different from the reference picture referred to by the block E to be coded.

Alternatively, if only one of the motion vectors MV1 and MV2 refers to the reference picture referred to by the block E (as determined in step S305), it is included in the median operation for calculation of the prediction motion vector PMV in steps S320 and S330.

If neither of the motion vectors MV1 and MV2 refers to the reference picture of the block E and they refer to different reference pictures (as determined in step S305), one thereof referring to a reference picture closest to the reference picture referred to by the block E, or a reference picture closest to a picture to be currently coded is selected in step S325 and included in the median operation for calculation of the prediction motion vector PMV in step S330.

Figure 5:
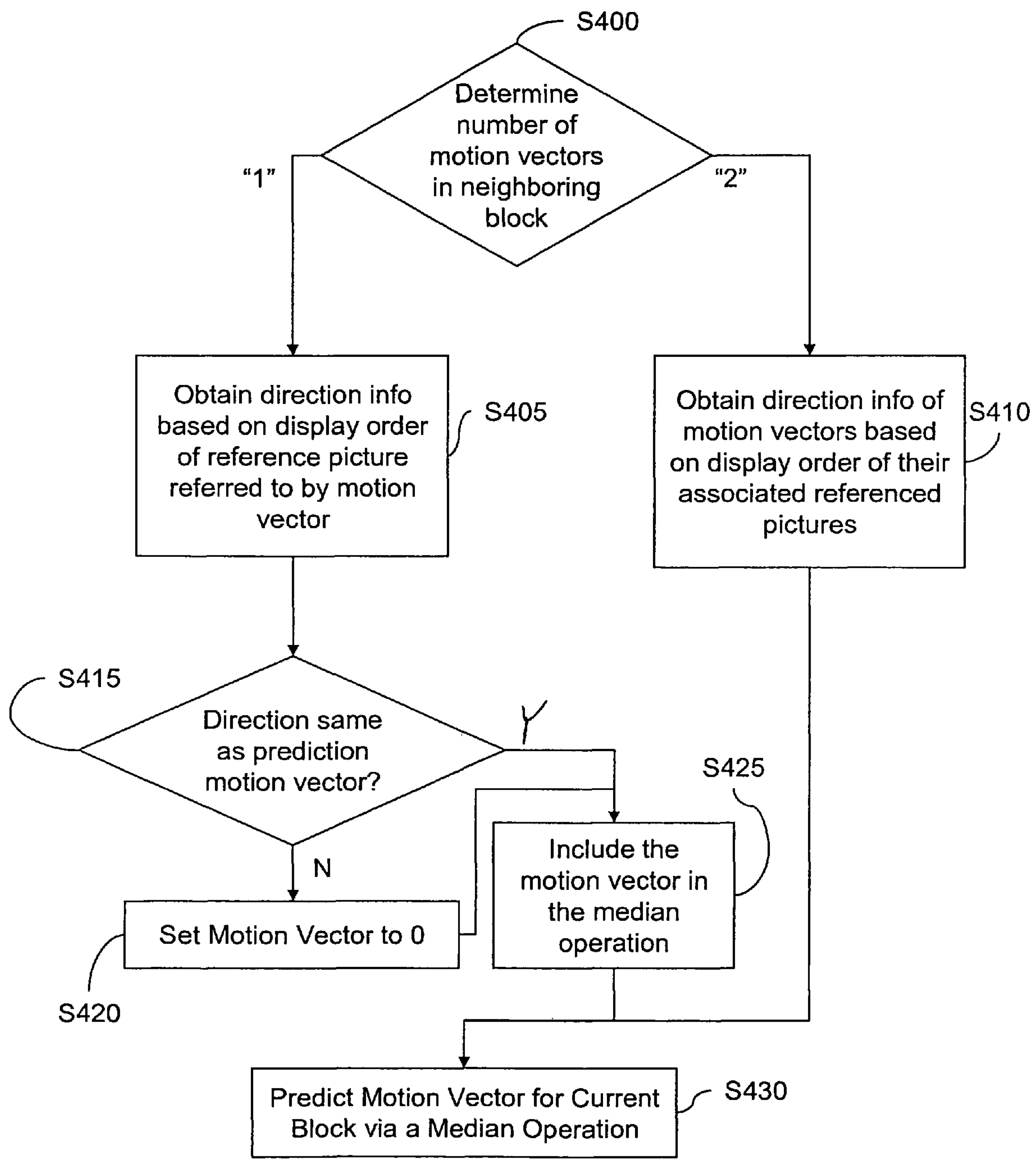
FIG. 5 is a flow chart illustrating a motion vector calculation for a case where two motion vectors of a neighboring block have the same directions, which are different from that of a prediction motion vector, according to another example embodiment of the present invention.

2.3 Case where Two Motion Vectors of Neighboring Block have the Same Directions, which are Different from That of Prediction Motion Vector PMV FIG. 5 is a flow chart illustrating a motion vector calculation for a case where two motion vectors of a neighboring block have the same directions, which are different from that of a prediction motion vector, according to another example embodiment of the present invention.

Two motion vectors MV1 and MV2 of a neighboring block are set to 0, the neighboring block is considered to refer to a reference picture different from the reference picture referred to by the block E, and the prediction motion vector PMV of the block to be coded is obtained through the median operation including the zero motion.

In this manner, when a neighboring block has two motion vectors (as determined in step S400), the directions of the motion vectors are recognized from display orders of associated reference pictures in step S410 and determinations are made as to whether they are the same as the direction of the prediction motion vector PMV, thereby making it possible to obtain a PMV more approximating an MV in step S430. This results in a reduction in the magnitude of a motion vector difference MVD (=MV−PMV) to be sent to the decoder and, in turn, a reduction in the amount of bits to be sent to the decoder. Accordingly, the entire coding efficiency can be raised.

On the other hand, in the case where a neighboring block has one motion vector (as determined in step S400), direction information of the motion vector is acquired from a display order of an associated reference picture in step S405. If the direction of the motion vector is not the same as that of the prediction motion vector (as determined in step S415), the motion vector is set to 0 in step S420, the neighboring block is considered to refer to a reference picture different from the reference picture referred to by the block to be coded, and the prediction motion vector is obtained through the median operation including zero motion in steps S425 and S430.

Further, in the case where a neighboring block has one motion vector (as determined in step S400), direction information of the motion vector is acquired from a display order of an associated reference picture in step S405. If the direction of the motion vector is the same as that of the prediction motion vector (as determined in step S415), the motion vector is included in the median operation for calculation of the prediction motion vector in steps S425 and S430.

As apparent from the above description, the present invention provides a method for assigning direction information to reference pictures and a method for determining the directions of the reference pictures, wherein display order information enabling the acquisition of direction information of motion vectors is assigned to each reference picture. Therefore, information regarding a direction from a block to be currently coded to each reference picture can be acquired.

Further, the present invention provides a prediction motion vector calculation method by defining a motion vector to be used in a median operation when a neighboring block around a block to be coded has two motion vectors due to a bi-predictive mode or direct mode of a B picture. As a result, a prediction motion vector (PMV) of the block to be coded can be predicted using motion vector information of neighboring blocks, and a coding efficiency can be improved.

Although the example embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of predicting a motion vector for a current block in a current picture by a moving picture decoding device, the method comprising:

remapping, by the moving picture decoding device, reference picture indices for a plurality of reference pictures, based on remapping information;

obtaining, by the moving picture decoding device, at least one motion vector of a block other than the current block, wherein said other block is associated with at least one reference picture indicated by a reference index for a set of multiple reference pictures, said other block is in a bi-predictive mode or in a direct mode;

obtaining, by the moving picture decoding device, a first picture order count value of the current picture, wherein the first picture order count value represents a display order of the current picture;

obtaining, by the moving picture decoding device, a second picture order count value of the at least one reference picture, wherein the second picture order count value represents a display order of the at least one reference picture;

comparing, by the moving picture decoding device, the first picture order count value of the current picture with the second picture order count value of the at least one reference picture;

predicting, by the moving picture decoding device, the motion vector for the current block using said at least one motion vector, based on the comparison; and decoding the current block in the current picture using the predicted motion vector.

* * * * *